May 12, 1942.  L. D. FITLER, JR., ET AL  2,282,958
HYDROMETER
Filed June 23, 1941
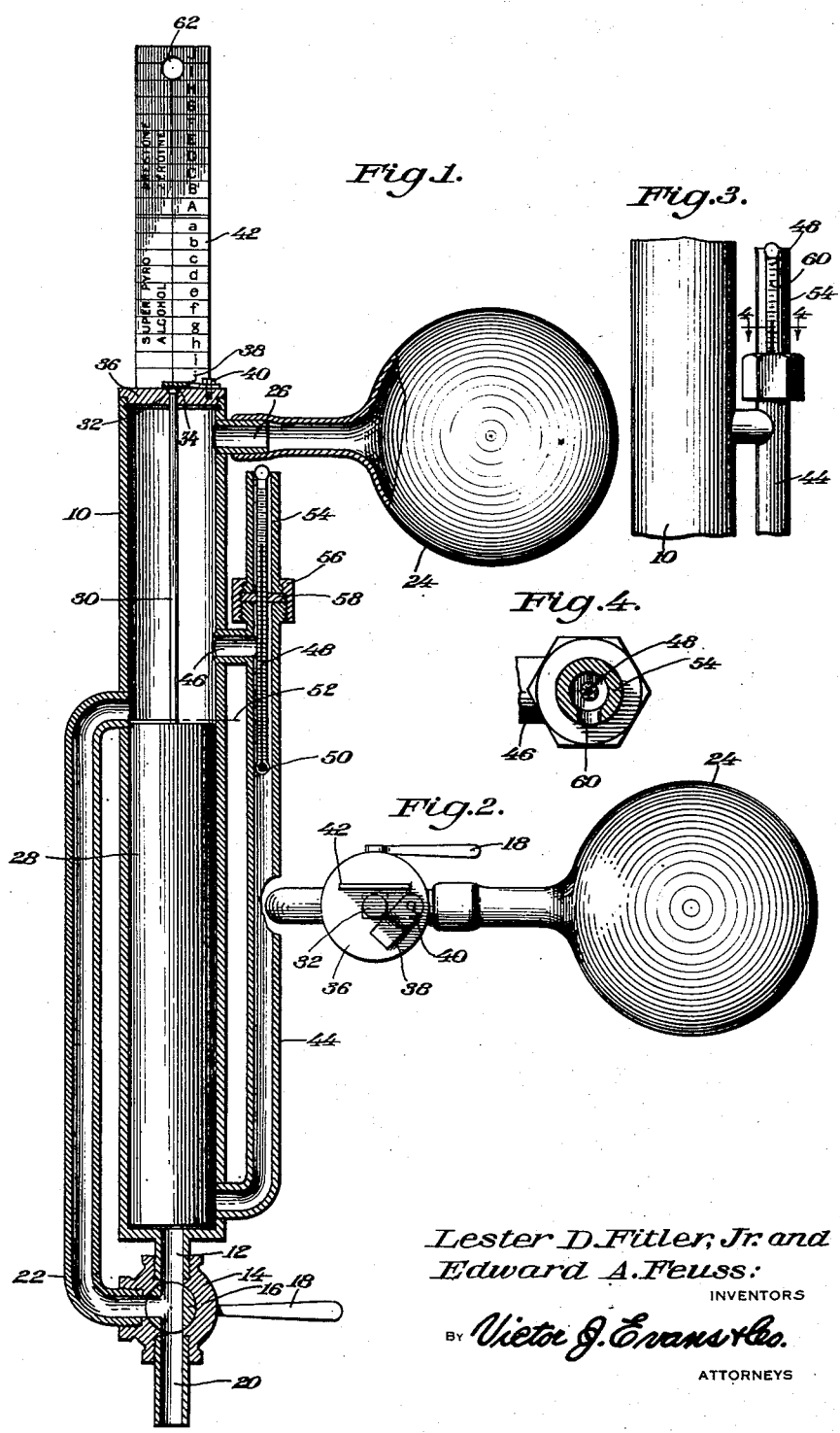
Lester D. Fitler, Jr. and
Edward A. Feuss,
INVENTORS
BY Victor J. Evans & Co.
ATTORNEYS
WITNESS Patented May 12, 1942

2,282,958

UNITED STATES PATENT OFFICE 2,282,958

HYDROMETER

Lester D. Fitler, Jr., New York, N. Y., and Edward A. Feuss, Bloomfield, N. J., assignors to F. Morse Smith and James G. Henry, Jr., both of Montclair, N. J.

Application June 23, 1941, Serial No. 399,354

10 Claims. (Cl. 265—45)

This invention relates to improvements in devices useful in determining the specific gravity of liquids and especially is concerned with a novel direct reading hydrometer.

One of the principal disadvantages of existing types of hydrometers is that the calibrated floating member exhibits a marked tendency to oscillate during a reading with resultant difficulty in obtaining an accurate or satisfactory reading. Another disadvantage of existing types of hydrometers is that the solution retained within the hydrometer chamber not infrequently tends to run out through the discharge tube, thus in many instances vitiating the reading, particularly when solutions having extremely low surface tension are being examined.

It is among the more important objects of this invention to provide a novel hydrometer which, by reason of internal structure, provides frictional damping of movement of the float member, thus avoiding the first mentioned of the above disadvantages of existing types of hydrometers.

Another object of this invention is to provide in a novel hydrometer construction means for inhibiting leakage of solution from the hydrometer chamber, thereby permitting more accurate readings than have been possible with some of the types of hydrometers now in use.

A further object is to provide a novel hydrometer provided with means facilitating the use of a thermometer for taking temperature readings of the liquid being tested.

An important advantage of the novel hydrometer construction according to this invention is the facility in which the calibrated scale thereof may be read as contrasted to the difficulty of reading of many existing types of hydrometers, particularly the float types wherein a calibrated scale carried upon the float is read against the index provided by the meniscus of the liquid wherein the instrument floats.

Noteworthy among the features of the novel hydrometer according to the present invention are its simplicity and ruggedness of construction, the former suiting the device to the requirements of manufacture under conditions of mass production and the latter assuring long useful life.

Other objects, advantages and features of the new and improved hydrometer according to the present invention will be apparent to those skilled in this art during the course of the following description.

Regarded in certain of its broader aspects the novel hydrometer according to this invention comprises a vertically extending chamber wherein a vertically slidable buoyant float is positioned said float carrying an index cooperating with a scale on the chamber, means for admitting liquid to be tested into the bottom of the chamber and withdrawing liquid from the chamber to a predetermined level, and means for drawing liquid into the interior of the chamber.

In the accompanying drawing:

Figure 1 is substantially a vertical sectional view of the presently preferred embodiment of this invention;

Figure 2 is essentially a top plan view of the same;

Figure 3 is an elevational view of a portion of the structure of Figure 1 illustrating the window through which the thermometer reading is visible; and Figure 4 is a sectional view along the line 4—4 of Figure 3.

In the embodiment selected to illustrate our invention, we make use of a barrel 10 provided with a tubular neck 12 at its lower end for connection with a valve 14. Valve 14 includes a rotatable plug 16 having an operating handle 18 connected therewith. Valve 14 is provided with an inlet tube 20 and has communication with one end of an overflow by-pass tube 22, the latter having its other end communicating with the barrel 10 intermediate its ends.

Through adjustment of the valve plug 16, the barrel 10 may be placed in communication with the inlet tube 20. To draw liquid into the barrel, when the valve plug 16 is positioned in a manner such that communication is established between the interior of the barrel and the tube 20, a compressible bulb 24 is connected with a short tubular element 26 communicating with the interior of the barrel 10 closely adjacent its upper end.

Inside the barrel 10 is located a float 28 which has the contour of a cylinder and of such diameter as to be spaced slightly from the wall of the barrel 10. However, the float may move freely relatively to the barrel.

An index rod 30 projects axially of the upper end of the float 28 and is provided with a flattened end 32 adapted to seat within a countersunk opening 34 in the cap 36 which closes the upper end of the barrel. Cap 36 is bored to slidably receive the index rod 30, and the cap may be threadedly connected with the barrel, as illustrated.

A clip 38 is pivotally mounted on the cap 36 through the medium of a bolt 40, and the clip is arranged to overlie the end 32 of the index rod 30 to restrict movement of the float 28 and hold the latter in the manner of Fig. 1. When the clip is swung to the full line position of Fig. 2, the clip clears the end 32 so that the float is freed.

A graduated scale 42 is mounted on the cap 36 and parallels the axis of the barrel. Thus the index rod 30 may be moved relatively to the scale 42, particularly the end 32 of the rod, through the medium of the float 28. Accordingly, a reading coaction exists between the end 32 and the scale.

A tube 44 communicates with the barrel 10 near its bottom and has communication with the barrel intermediate its ends through the medium of a tubular branch 46. A thermometer 48 extends into the upper end of the tube 44, and the bulb end 50 of the thermometer extends beneath the liquid level 52 in the barrel 10. To the upper end of the tube 44 is connected a tubular thermometer guard 54 through the medium of a gland nut 56, with rubber packing 58 interposed between the upper end of the tube and the guard. While the thermometer 48 extends through the rubber packing 58, the latter has liquid sealing engagement therewith, and the tubular element 46 is located slightly beneath the packing. A slot 60 is provided in the guard 54 to provide a window which lends visibility to the reading on the thermometer.

In operation, the clip 38 is swung into engagement with the end 32 on the index rod 30. With the valve plug 16 adjusted to establish communication between the barrel 10 and the inlet tube 20, the bulb 24 is compressed and the inlet tube inserted in the liquid to be tested. Upon release of pressure from the bulb 24, the latter returns to its normal condition and draws liquid into the barrel 10. After the bulb 24 has been fully distended, the valve plug 16 is turned to place the neck 12 in communication with the by-pass tube 22, and the clip 38 is moved clear of the end 32 to permit the float 28 to rise. The valve plug 16 is then turned to place the inlet tube 20 into communication with the by-pass tube 22, which permits the liquid to drain to the exact level 52. Accordingly, the specific gravity of the liquid may then be determined by inspection of the end 32 with reference to the scale 42. A table should be provided to correlate the temperature of the solution at the time of the reading with the scale readings to give the freezing point of the solution.

For convenience, an opening 62 is provided in the scale 42 to receive an appropriate supporting pin. When not in use, the float 28 is latched in the position of Fig. 1 by merely pivoting the clip 38 into engagement with the end 32.

Having thus described certain embodiments of our invention in detail, it is, of course, understood that we do not desire to limit the scope thereof to the exact details set forth except insofar as those details may be defined in the appended claims.

We claim:

1. A hydrometer comprising: a barrel; an inlet communicating with said barrel; means for introducing fluid into the barrel; a scale fixedly related to said barrel; a float slidably guided inside the barrel and having an index element cooperable with said scale for indicating relative positions of the float inside the barrel; a two-way valve arranged in said inlet; and an overflow conduit placing said barrel in communication with one part of said valve.

2. A hydrometer comprising: a barrel; a valve controlled inlet communicating with said barrel; means for introducing fluid into the barrel; a scale fixedly related to said barrel; a float slidably guided inside the barrel and having an index element cooperable with said scale for indicating relative positions of the float inside the barrel; an overflow conduit placing said barrel in communication with said valve; said barrel being provided with a by-pass conduit; and a thermometer supported in the by-pass conduit for contact with liquid in the by-pass conduit at its lowest normal level therein.

3. The invention described in claim 2 wherein a tubular guide is provided for said thermometer, with said tubular guide provided with a window exposing the scale on the thermometer.

4. The invention described in claim 2 wherein said by-pass conduit is provided with a tubular extension threadedly connected therewith for housing the thermometer; a sealing gasket between the by-pass conduit and said tubular extension; said thermometer extending through said sealing means and sealingly engaging the latter; and said tubular extension being provided with a window exposing the scale on the thermometer.

5. The invention described in claim 1 wherein said index element includes a rod and a flattened end; and a clip element arranged to engage said flattened end to restrain rising of the float and the index element.

6. The invention described in claim 1 wherein said valve is so constructed and arranged as to selectively establish communication between the barrel and a liquid source or between the overflow conduit and the atmosphere.

7. A hydrometer comprising: a barrel; an inlet tubular means at one end of said barrel; a valve interposed in said inlet tube; a float slidable inside the barrel having an index element secured thereto; a scale fixedly related to said barrel; said barrel having an end provided with an opening for slidably guiding said index element, with the latter arranged in coacting relation with said scale; an overflow tube having communication with the barrel and said valve; a compressible bulb communicating with the barrel for drawing liquid therein through said inlet tubular means; and a latch means for said index element to latch the float in a retracted position.

8. The invention described in claim 7 wherein said barrel is provided with a by-pass tube; a guard communicating with said by-pass tube; and a thermometer located inside the guard and extending into said by-pass tube for contact with liquid therein.

9. The invention described in claim 7 wherein said barrel is provided with a by-pass tube; a guard communicating with said by-pass tube; a thermometer located inside the guard and extending into said by-pass tube for contact with liquid therein; a threaded connection between said guard and said by-pass conduit; and a sealing gasket between the guard and the by-pass tube, with the thermometer extending through the gasket and sealingly engaging the latter.

10. The invention described in claim 7 wherein said barrel is provided with a by-pass tube; a guard communicating with said by-pass tube; a thermometer located inside the guard and extending into said by-pass tube for contact with liquid therein; a threaded connection between said guard and said by-pass conduit; a sealing gasket between the guard and the by-pass tube, with the thermometer extending through the gasket and sealingly engaging the latter; and said guard comprising opaque material having a slot arranged to expose the scale on the thermometer.

LESTER D. FITLER, Jr.
EDWARD A. FEUSS.